(12) United States Patent
Abreu et al.

(10) Patent No.: US 9,664,043 B2
(45) Date of Patent: May 30, 2017

(54) ROCK WALL CLOSURE DETECTION DEVICE

(71) Applicant: NCM INNOVATIONS (PTY) LTD, Johannesburg (ZA)

(72) Inventors: Rual Abreu, Johannesburg (ZA); Cacius Mahlatj, Johannesburg (ZA)

(73) Assignee: NCM INNOVATIONS (PTY) LTD, Johannesburg (ZA)

( * ) Notice: Subject to any disclaimer, the term of this patent is extended or adjusted under 35 U.S.C. 154(b) by 0 days.

(21) Appl. No.: 14/897,080

(22) PCT Filed: Sep. 2, 2014

(86) PCT No.: PCT/ZA2014/000045
§ 371 (c)(1),
(2) Date: Dec. 9, 2015

(87) PCT Pub. No.: WO2015/035430
PCT Pub. Date: Mar. 12, 2015

(65) Prior Publication Data
US 2016/0168994 A1   Jun. 16, 2016

(30) Foreign Application Priority Data

Sep. 5, 2013 (ZA) .................................. 2013/06661

(51) Int. Cl.
*G01V 1/00* (2006.01)
*G08B 5/30* (2006.01)
(Continued)

(52) U.S. Cl.
CPC .............. *E21F 17/185* (2013.01); *G01V 1/00* (2013.01); *G08B 3/10* (2013.01); *G08B 5/36* (2013.01)

(58) Field of Classification Search
None
See application file for complete search history.

(56) References Cited

U.S. PATENT DOCUMENTS 2,692,924 A * 10/1954 Williams ................ E21D 15/46
116/67 R
3,460,258 A * 8/1969 Bolen .................... E21F 17/185
33/1 H (Continued)

FOREIGN PATENT DOCUMENTS

BE 493415 5/1950
FR 716766 12/1931

(Continued)

OTHER PUBLICATIONS

International Search Report for Application No. PCT/ZA2014/000045 dated Sep. 18, 2015 (5 pages).

*Primary Examiner* — Fekadeselassie Girma
(74) *Attorney, Agent, or Firm* — Michael Best & Friedrich LLP

(57) ABSTRACT

The invention provides a rock wall closure detection apparatus which includes an elongate member, variably extensible between a first wall and a second wall Of an underground excavation which comprises of a first and a second segment which are resiliently axially compressible relatively to one another when the waits close and an indicator module which produces a warning signal when actuated, attached to the first segment and an actuator attached to the second segment wherein on compression of the member, the actuator moves relatively to the module to actuate the module to produce the warning signal.

10 Claims, 5 Drawing Sheets

(51) Int. Cl.
   *E21F 17/18*   (2006.01)
   *G08B 3/10*    (2006.01)
   *G08B 5/36*    (2006.01)

(56) References Cited

U.S. PATENT DOCUMENTS

| | | | |
|---|---|---|---|
| 3,594,773 A | 7/1971 | Conkle et al. | |
| 3,600,938 A * | 8/1971 | Waddell | G01B 7/18 33/1 H |
| 3,646,553 A * | 2/1972 | Conkle | E21F 17/185 33/1 H |
| 3,786,503 A * | 1/1974 | Webb | E21F 17/185 200/56 R |
| 4,058,079 A * | 11/1977 | Taylor | E21D 21/0093 116/283 |
| 4,155,326 A * | 5/1979 | Ellis | G09F 7/00 101/354 |
| 4,156,236 A * | 5/1979 | Conkle | E21F 17/185 340/690 |
| 4,570,553 A * | 2/1986 | Ito | A01B 79/00 111/118 |
| 4,655,644 A * | 4/1987 | Lane | E21D 20/026 405/259.3 |
| 4,988,974 A * | 1/1991 | Fury | B60P 1/045 280/432 |
| 5,185,595 A * | 2/1993 | Friesen | E21D 21/008 340/540 |
| 5,307,053 A * | 4/1994 | Wills | F41A 17/06 340/539.1 |
| 6,218,938 B1 * | 4/2001 | Lin | G08B 13/22 340/521 |
| 8,164,473 B2 * | 4/2012 | Robertson, Jr. | G08B 13/08 340/686.1 |
| 9,080,438 B1 * | 7/2015 | McCoy | E21B 47/18 |
| 2003/0179089 A1 * | 9/2003 | Sweatt | G08B 27/00 340/539.1 |
| 2007/0277385 A1 * | 12/2007 | Bullock | G01C 9/06 33/366.11 |
| 2008/0278319 A1 * | 11/2008 | Meiksin | F16B 31/02 340/540 |
| 2009/0251332 A1 * | 10/2009 | Senogles | H04Q 9/00 340/870.02 |
| 2010/0141464 A1 * | 6/2010 | Robertson, Jr. | G08B 13/1436 340/686.1 |
| 2013/0249700 A1 * | 9/2013 | Hsieh | B25B 23/1425 340/665 |
| 2014/0123773 A1 * | 5/2014 | Lemmer | G01K 13/12 73/863.01 |

FOREIGN PATENT DOCUMENTS

| | | |
|---|---|---|
| GB | 191411916 | 2/1915 |
| WO | 96/39610 | 12/1996 |
| WO | 2012139163 | 10/2012 |

* cited by examiner

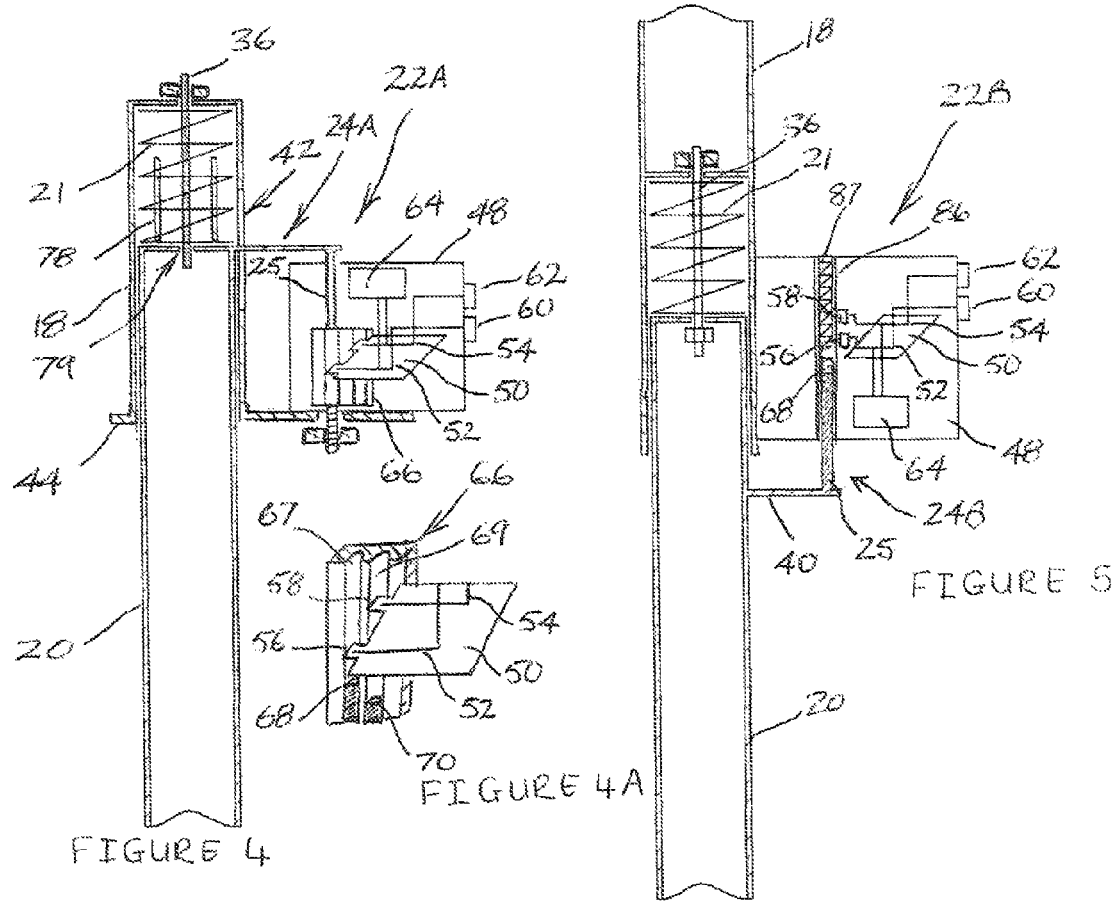

ROCK WALL CLOSURE DETECTION DEVICE

BACKGROUND OF THE INVENTION

This invention relates to a rock wall closure detection apparatus for detecting and signalling movement of one rock wall in an excavation relative to another, to forewarn workers in the excavation of the possibility of rock fall and, more particularly, to an apparatus that can be re-deployable.

Most apparatus that are adapted to provide an indication of relative movement in rock walls are permanently or semi-permanently fixed in position, typically within a rock hole formed in a particular rock wall.

Such apparatus are not easily re-usable, or capable of easy dis-assembly and re-assembly in another location.

The present invention, at least partially, addresses the aforementioned problem.

SUMMARY OF INVENTION

The invention provides a rock with closure detection apparatus which includes:

an elongate member, which is axially variably extensible between a first wall and a second wall of an underground excavation, comprising at least a first and a second segment which are resiliently axially compressible relatively to one another when the walls close;

an indicator module which produces a warning signal when actuated, attached to the first segment, and an actuator attached to the second segment;

wherein on compression of the member, the actuator moves relatively the module to, actuate the module to produce the warning signal.

The first and second segments may be telescopically inter-engaged.

The elongate member may include a biasing member, for example a spring, located between the first and second segments.

The actuator may include a switch contact.

The indicator module may include at least a first signal circuit, a first signal device, and a power source to power the first circuit and the signal device.

The indicator module may include a housing at least partially within which the signal circuit and the power source are contained.

The first circuit may include a first switch.

The actuator may move relatively to the indicator module, between a first position, at which the contact and the first switch are spaced, and a second position, at which the contact engages the switch to actuate the first signal device to produce the warning signal.

The indicator module may include a second signal circuit, a second switch and a second signal device.

The first position may be a position at which the contact engages the second switch to produce a second signal which indicates that the apparatus is correctly pre-set.

The actuator may include a clamping platform which is slidably engaged to the second segment when not clamped to the segment to define the first position.

The actuator may include a rigid or a rigidified elongate element.

The elongate element may extend in parallel relationship with the elongate member.

The element may be a rod, a piston, a filament or the like.

The element may include the switch contact.

The warning signal and second signal may be either an audible or visible signal.

The first and the second, signal device may include at least one LED of a first colour and a second colour respectively.

BRIEF DESCRIPTION OF THE DRAWINGS

The invention is further described by way of examples with reference to the accompanying drawings in which;

FIG. 4 is a schematic diagram of the rock closure detection apparatus of FIG. 1;

FIG. 5 is a schematic diagram of the apparatus of FIG. 2;

DESCRIPTION OF PREFERRED EMBODIMENTS

Figure 1:
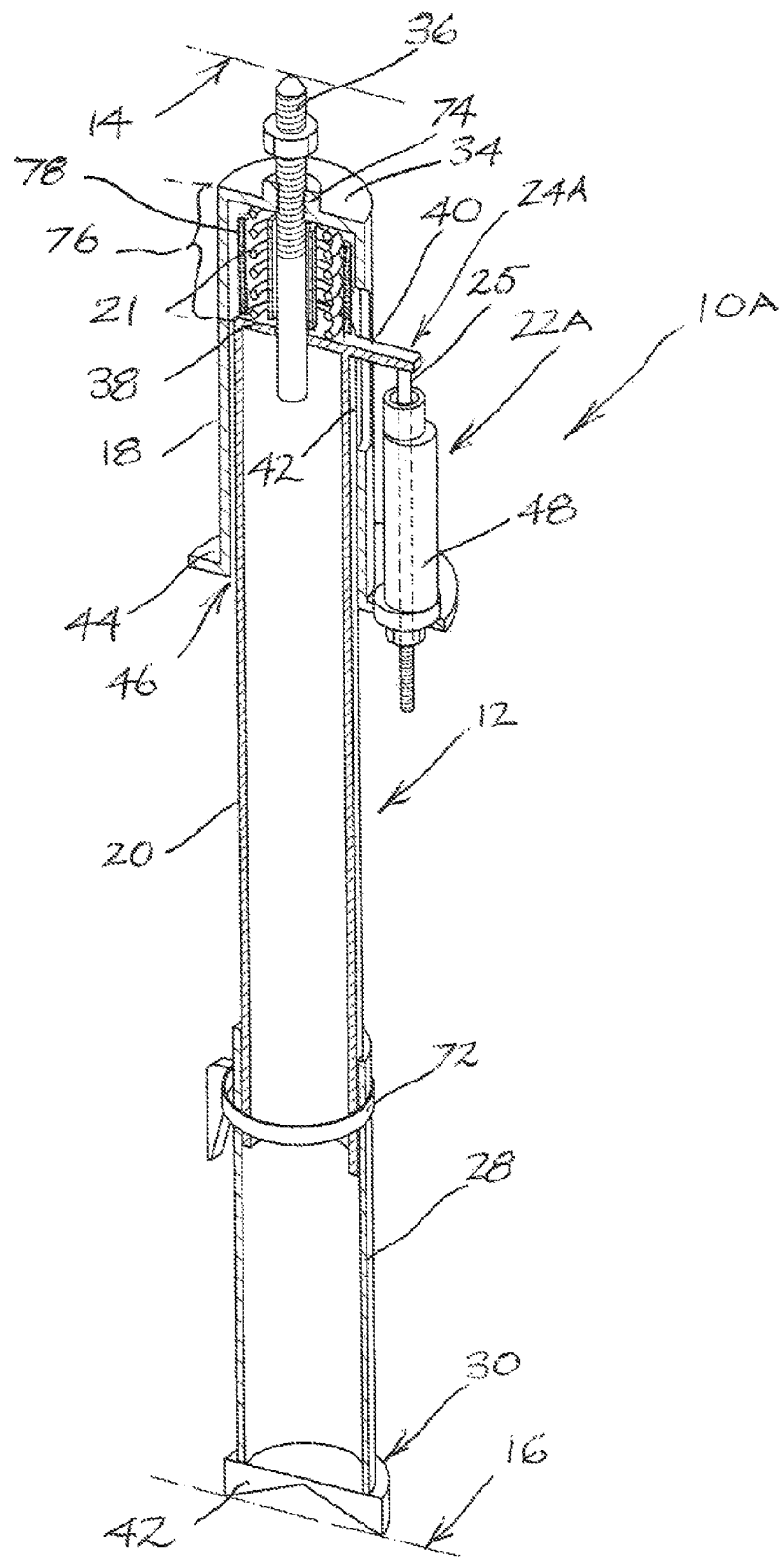
FIG. 1 is an isometric, longitudinally sectioned, illustration of a first embodiment of the invention.

FIGS. 1 and 4 illustrate various embodiments of a rock wall closure detection apparatus, respectively designated 10A, 16B and 10C in accordance with the invention.

A first embodiment of the rock anchor 10A, illustrated in FIG. 1, includes an elongate member 12 which is axially variably extensible between a hanging wall 14 and a foot wall 16 of an underground excavation.

The elongate member 12 includes, at least, a first cylindrical section 18 and a second cylindrical segment 20. Each of these segments is telescopically inter-engaged with one another, having a spring 21 located between the first and the second segments allow the elongate member to resiliently axially compress to accommodate closure of the hanging wall relatively to the footwall.

The apparatus 10A includes an indicator module 22A which produces a signal when actuated on closure the walls, and to which is attached the first segment 18. An actuator 24A, which includes a rigid elongate element 25, is attached to the second segment. The element extends in parallel relatively to and spaced from the elongate element to penetrate the indicator module and to move therein, to actuate the module to produce the signal when wall closure is detected.

The movement of the hanging wall relatively to the foot wall is thus transcribed by the apparatus 10A into the relative movement of the element an the module.

In this particular embodiment, and with reference to FIG. 1, the elongate member 12 includes an additional lower third tubular segment 28 which provides major longitudinal adjustment to the elongate member 12 and which has, at a lower end 30, a foot 42.

At an opposed upper end 32 the elongate member 12, defined by a capped end 34 of the first segment 18, a height-adjustable pin 36 is axially positioned to extend the capped end to provide minor longitudinal adjustment.

The actuator 24A has a bridge formation 40 to which the element 25 is attached to the second segment 18 to position the element in a spaced and parallel configuration relatively to the member 12. The bridge formation extends laterally from a closed end 38 of this segment, through a longitudinally extending slot 42 (see FIG. 2) formed through the wall of the first segment 18.

The indicator module 22A is on a laterally extending platform 44 located adjacent an open end 46 of the first segment.

The indicator module 22A of this particular embodiment is of a type described in South African patent application 2010/01315 the specification of which is here incorporated by reference, and described therein as a rock movement indicator.

In summary of the e detailed disclosure 2010/01315 the indicator module 22A includes a housing 48 through which the element 25 longitudinally extends and which houses a printed circuit board 50 on which a first and a second circuit (respectively designated 52 and 54), are partially laid out, a battery 64, and a first and second signal device (respectively designated 60 and 62).

These circuits are diagrammatically represented in FIG. 4 and are adapted to electronically link a first and a second switch, respectively designated 56 and 58, to a respective signal device (60, 62) and to power each of these signal devices, by drawing power from the battery 64, when the respective switch is actuated. In this particular example, each signal device includes at least one LED. Also in this particular embodiment, each switch is a mechanically actuate switch located on a respective tab formed along one edge of the circuit board 50.

The actuator element 25 fixedly carries a sleeve 66 on which is defined a first axial groove 67, terminating a first contact edge 68, and a second axial groove 69, terminating in a second contact edge 70, with each contact edge axially and laterally spaced from the other.

In use, the apparatus 10A is vertically positioned between the hanging wall 14 and the foot wall 16, with the foot 32 engaging the foot wall.

To vertically extend the elongate member 12 in situ into contact with the hanging wall, major height adjustment is achieved by telescopically extracting the second segment 20 from the third segment 28 until the tip of the height adjustment pin 36 nears the hanging wall. At this stage, the second and third segments (20 and 28) are locked in this position with the use of a clamp 72 (see FIG. 1) which encircles an upper end portion of the third segment.

Now, minor height adjustment can be achieved by turning the height adjustment pin 36 in a threaded mouth 74 of the capped end 34 of the first segment 18. This turning causes the pin to advance upwardly relatively to the mouth and the elongate member.

The capped end 34 of the first segment 18 is axially spaced from the closed end 38 of the second segment 20 to define a compressible segment 76 in which the spring 21 is located. With the elongate member 12 now spanning the vertical distance between the hanging and the foot wall, any movement of the hanging wall relatively to the foot wall, will cause the elongate member to axially compress. These compressive forces are accommodated about the compressible segment 76.

To prevent excessive compressive movement about this segment 76 during rock closure, which may potentially damage componentry in the indicator module 22A, a spacer 78 is also located in this segment. The spacer has a length which defines the maximum downward movement of segment 18 relatively to segment 20.

Once the elongate member 12 is assembled, the actuator element 25 is pre-set by moving the element, relatively to the housing 48, in a manner described in 2010/01315, so that the first contact edge 68 comes into contact with the first switch 56, with the respective tab moving along the first axial groove 67, and, with further movement, the tab breaks against the edge 68, activating the switch, the first circuit, and the illumination of the first LED 40.

As the hanging wall drops, due to overhead forces, the height adjustment pin 36 is forced downwardly to reactively push the first segment 18, to which it is fixedly attached, in the same direction. This action compresses the spring 21, reduces the length of the compressible segment 76, and lowers the platform 44 and the indicator module 22 positioned on the platform. The downward movement of the pin 36 is accommodated through an aperture 79 in the closed end 38.

As the second segment 20 does not move under this action, the actuator element 25 remains fixed in position. The housing 48 of the indicator module 22A moves downwardly over the element and it is this relative movement of the element to the indicator module that actuates the second signal device 62, as will be more fully described below.

With the element 25 pre-set in the manner described above and this pre-set position indicated by the illumination of the first LED which can, in this particular example, be a green LED, movement of the housing 48 relatively to the element 25 as described above causes the second contact edge 70 to contact, and break, the tab of the second switch 58. This actuates the second circuit 54 to energise the second LED 62, which in this particular example can be a red LED. The illumination of the red LED indicates to persons on the ground that the wall has moved a dangerously predetermined distance towards the hanging wall and that there is a high probability of rock failure.

Figure 2:
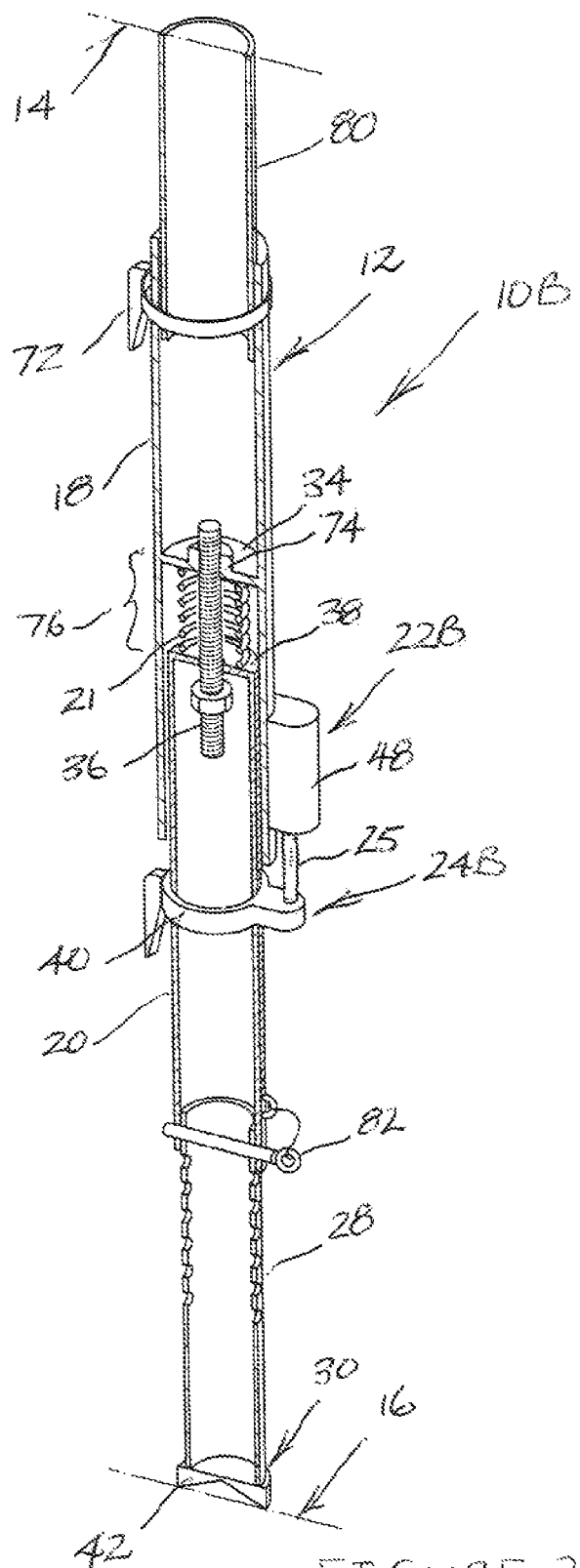
FIG. 2 is an isometric, longitudinally sectioned, illustration of a second embodiment of the invention.

FIGS. 2 and 5 illustrate a rock wall closure detection apparatus 10B, in accordance with a second embodiment of the invention.

In describing the second embodiment, and a third embodiment, the description of which follows, like of analogous features, relatively to the first embodiment, bear like designations.

The elongate member 12 of apparatus 10B is similarly extended, in situ, between the hanging and foot walls (12, 16). However, the elongate member of this embodiment has a fourth tubular segment 80 (see FIG. 2) telescopically engaged with the first segment 18, which provides the major height adjustment function, and it is similarly locked in position, once the member 12 has been appropriately lengthened, by a clamp 72.

The third tubular segment 28 is telescopically engaged with the second tubular segment 20, as with the embodiment 10A. However, it is only locked in position, relatively to the segment 20, at one pre-set position defined by a series of in-register holes passing laterally through the walls of the segments 20 and 28 and through which a release pin 82 is passed to secure this position.

Pulling on a pull-tie 84, attached at one end to the pin, to withdraw the pin from the holes, is a quick and remote way of collapsing the apparatus 10B to recover the apparatus prior to imminent hanging wall failure. Recovery of the apparatus is important as the apparatus is designed to be re-usable.

Another configurational difference between embodiments 10A and 10B is that the height adjustment pin 36 of the apparatus 10A no longer performs the function of height adjustment in the context of apparatus 10B. Instead, the pin 36 only functions to inter-engage the first and the second tubular element (10, 20), preventing these segments from pulling apart in the axial direction and about which the spring 21 is positioned. To provide minor height adjustment, the apparatus 10B can be provided with an analogous height adjustment device (not shown), attached to the upper end of the fourth tubular segment 80.

The housing 48 of the indicator module 22B is complementary moulded, on one surface, to marry to the outer surface of the first segment 18.

The actuator 24B includes a floating platform 40 which carries the element or piston 25 and which can be variably slidably positioned along the second segment 20, to pre-set the piston 25 relatively to the housing 48. Once the desired pre-set position is achieved, the platform is clamped to this position.

With reference to FIG. 5, the indicator module 22B, like its counterpart, includes a printed circuit board 50, first and second circuits (52, 54), first and second signal devices (60, 62), and a battery 64, all of which, with the exception of the signal devices, are housed within the housing 48.

However, the indicator module 22B differs from module 22A in that the first and second switches (56, 58) are not mechanically actuated. Each switch is a brush, axially spaced from one another, each of which is electrically actuated on contact with a contact point 68 on the piston 25.

With the elongate member 12 assembled to span the vertical distance between walls 14 and 16, movement of the hanging wall relatively to the foot wall will cause the member 12 to axially compress about the compressible segment 67.

The first segment 18 will move downwardly over the second segment 20 causing the piston 25 to move relatively to the housing 48, within a complementary channel 86 topped by a spring 87, from a pre-set position at which the contact point 68 contacts the first switch or brush 56, causing a green LED of the first signal device 60 to illuminate as an indication of pre-set to an advanced position within the channel 86.

The predetermined magnitude of the drop in the hanging wall 14 assessed to be dangerous, is transposed in the axial distance between the first and the second switches (56, 58). Thus, should the hanging wall experience a drop of this predetermined magnitude, the piston will advance from the pre-set position, to a position at which the contact point 68 contacts the second switch or brush 58, actuating the second circuit 54 to energise a red LED of the second signal device 62 as a warning.

Figure 3:
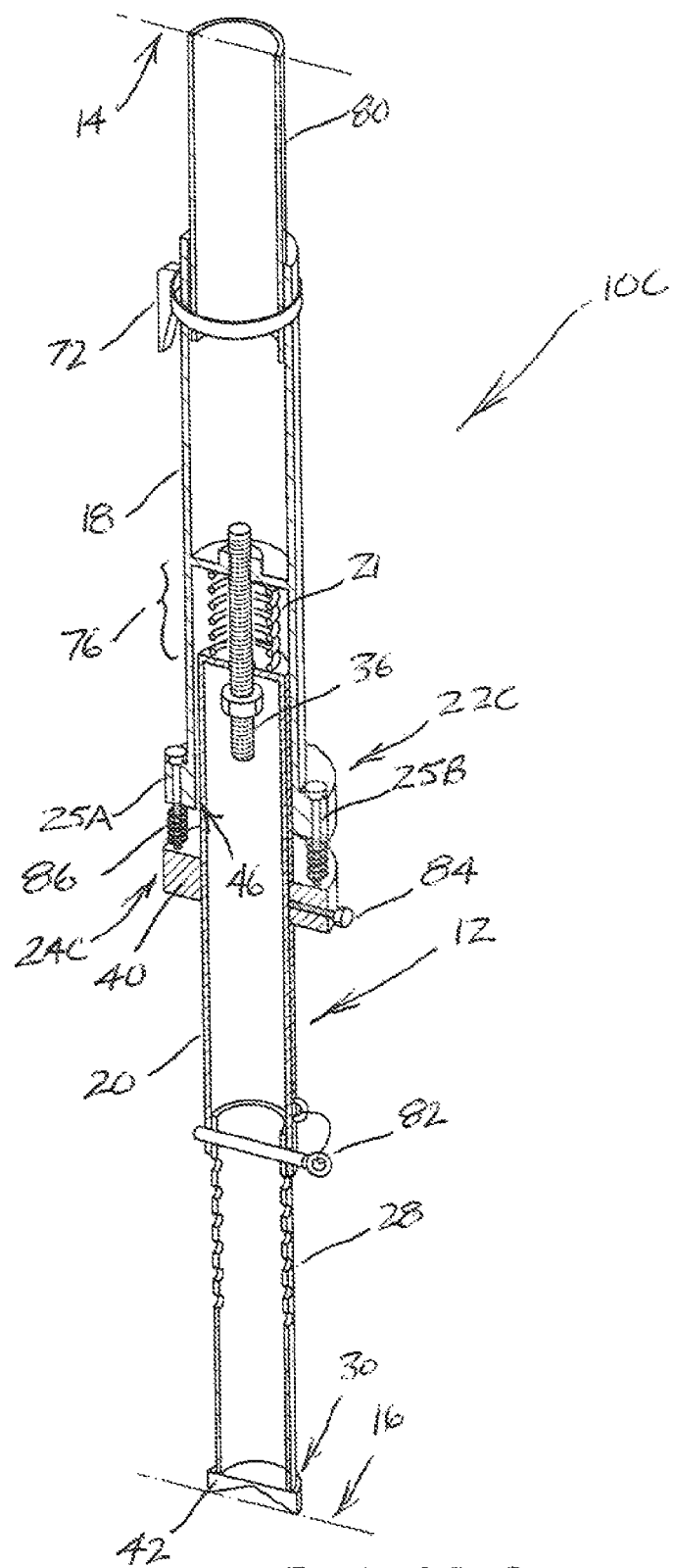
FIG. 3 is an isometric, longitudinally sectioned, illustration of a third embodiment of the invention.
Figure 6:
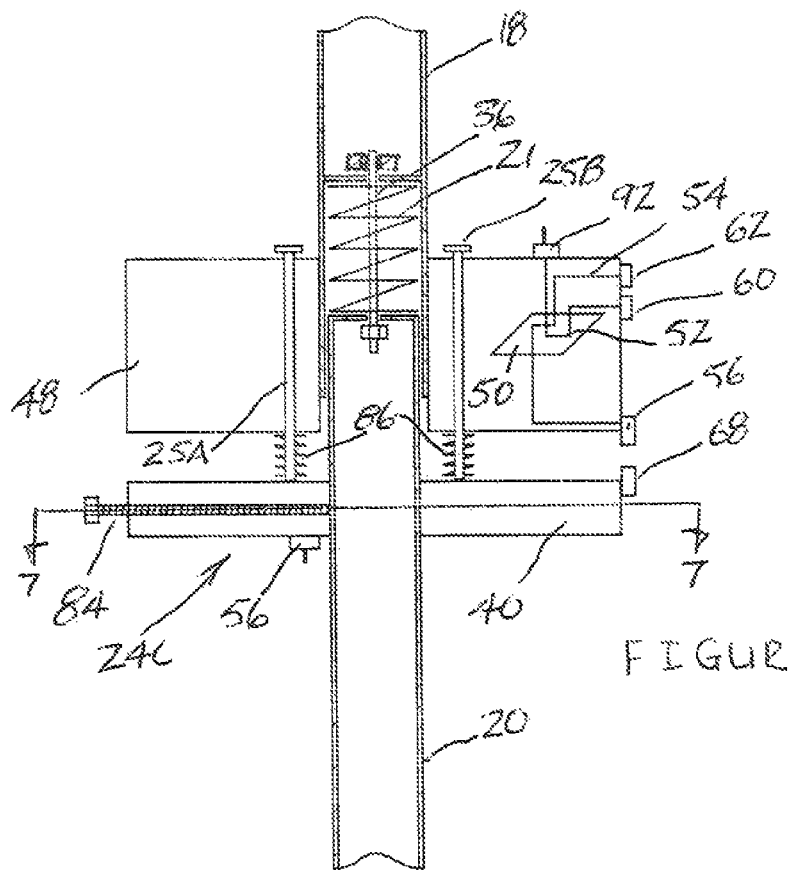
FIG. 6 is a schematic diagram of the apparatus of FIG. 3.
Figure 7:
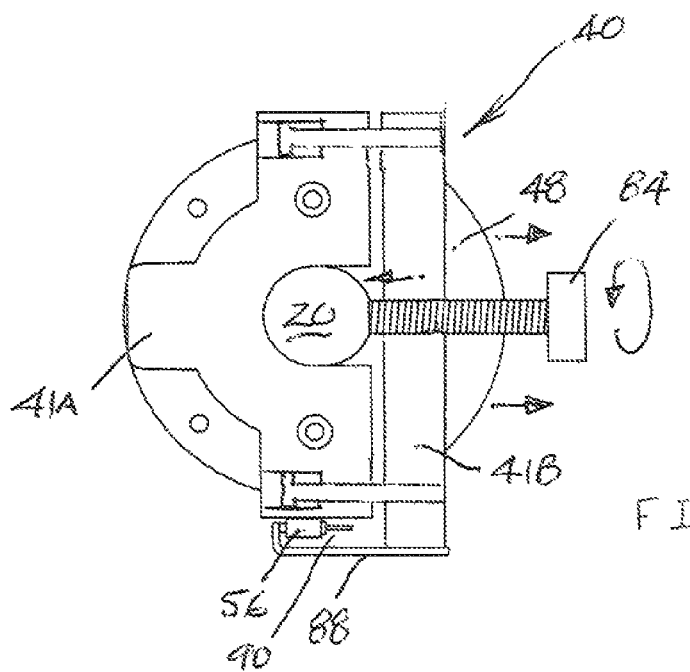
FIG. 7 is a view in cross section through line 7-7 of FIG. 6.

FIGS. 3, 6 and 7 illustrate a rock wall closure detection apparatus 10C, in accordance with a third embodiment of the invention.

The elongate member 12 of the apparatus 10C, having a first, second, third and fourth tubular segments (18, 20, 28 and 80) configured in substantively the same manner as with counterpart apparatus 10B.

The housing 48 of the indicator module 22C is a cylindrical disc-shaped housing that wraps around, and is fixedly located at, a lower end 46 of the first segment 18. The actuator 24C, like with actuator 24B, also includes a floating platform 40, comprising of two half sections 41A and 41B (see FIG. 7), which encircles the segment 20 to variably slidably engage the segment.

However, the actuator 24C differs from its counterpart 24B in that it carries a pair of rod-like elements (25A and 25B) that function to prevent lateral movement of the actuator relatively to the housing, but allowing relative axial movement. Neither of these elements of this embodiment carries a contact point and therefore do not function to contact a switch to actuate an alarm response. This is achieved in a different manner as will be described below.

To pre-set the platform 40 relatively to the housing 48, the platform is clamped into a fixed position on the second segment 20 by turning a clamp pin 84, which passes through platform section 41B, to draw section 41B laterally outwardly, as indicated by a directional arrow on FIG. 7 and to cause a free inner end of the pin to frictionally abut the segment 20.

Now that the platform 40 is fixed in place, and the elongate member 12 spanning the vertical distance between walls 14 and 16, any movement of the hanging wall relatively to the foot wall will cause the member to axially compress about compressible segment 76, and this movement is transposed into movement of the housing 48 downwardly towards platform 40. This movement compresses a pair of spacing springs 86, each of which is located around an interspersing part of a respective element 25.

With reference to FIG. 6, the indicator module 22C also includes a printed circuit board 50, with first and second circuits (52, 54), first and second signal devices (60, 62) and a battery 64.

The substantive difference between this embodiment of the apparatus 10C, and earlier described embodiments, is that the contact 68 is not located on an elongate element or piston (25) but on a perimeter edge of the platform 40. With sufficient movement of the housing 48 downwardly towards the platform, as explained above, the second switch 56 comes into contact with the contact 68 causing a red LED of the second signal device 62, to illuminate as a warning.

How the apparatus 10C is to be pre-set, which generally involves fixing the position of the platform 40 relatively to the housing 48 as has been explained, also differs in specifics from earlier described embodiments.

The platform section 41B includes a metallic contact arm 88 which extends from one end of section 41B towards, and partially beyond, section 41A. The arm is bent inwardly at its free end to provide a point at which contact with a first or remote switch 56 occurs when section 41B is drawn outwardly relatively to section 41A into a clamping position, actuated by the turning of clamp pin 84.

Without physical communication with the first circuit 52, communication that contact has been made and that the platform is in a pre-set position is made via an electromagnetic signal transmitted by a transmitter 90, integral with the switch 56, and received by a receiver 92.

The receiver is in electronic communication with the first circuit. On receipt of the switching signal from remote switch 56, the first circuit is energised to cause a green LED of the first signal device to illuminate as a pre-set indicator.

The invention claimed is:
1. A rock wall closure detection apparatus which includes:
an elongate member, which is axially variably extensible between a first wall and a second wall of an underground excavation, comprising at least a first and a second segment which are resiliently axially compressible relatively to one another when the walls close;
an indicator module attached to the first segment which includes a first and a second signal circuit, a first and a second signal device, a first and a second switch and a power source to power the circuits and the signal devices;
an actuator attached to the second segment which includes at least one contact;
wherein on compression of the member, the actuator moves relatively to the module between a first position, at which the at least one contact and the first switch are spaced, and a second position, at which the contact engages the first switch to actuate the first signal device to produce a warning signal; and wherein the first position is a position at which the at least one contact engages the second switch to actuate the second signal device to produce a second signal indicating that the apparatus is correctly pre-set.

2. A rock wall closure detection apparatus according to claim 1 wherein the first and the second segments are telescopically inter-engaged.

3. A rock wall closure detection apparatus according to claim 1 wherein the elongate member includes a biasing member located between the first and second segments.

4. A rock wall closure detection apparatus according to claim 1 wherein the indicator module includes a housing at least partially within which the signal circuits and the power source are contained.

5. A rock wall closure detection apparatus according to claim 1 wherein the actuator includes a clamping platform which is slidably engaged to the second segment, when not clamped to the segment to define the first position.

6. A rock wall closure detection apparatus according to claim 5 wherein the actuator includes a rigid elongate element which extends in parallel relationship with the elongate member.

7. A rock wall closure detection apparatus according to claim 6 wherein the element includes the at least one switch contact.

8. A rock wall closure detection apparatus according to claim 1 wherein both the warning signal and second signal are either an audible or visible signal.

9. A rock wall closure detection apparatus according to claim 1 wherein the first and the second signal device includes at least one LED of a first colon and a second color respectively.

10. A rock wall closure detection device according to claim 1 wherein the actuator includes a first contact and a second contact each of which are respectively positioned on the actuator to contact the first switch and second switch respectively.

* * * * *